United States Patent
Zhang et al.

(10) Patent No.: US 9,832,280 B2
(45) Date of Patent: Nov. 28, 2017

(54) USER PROFILE CONFIGURING METHOD AND DEVICE

(71) Applicant: Tencent Technology (Shenzhen) Company Limited, Shenzhen (CN)

(72) Inventors: Wenyu Zhang, Guangdong (CN); Kunqian Hong, Guangdong (CN); Yajuan Song, Guangdong (CN); Chong Du, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/101,851

(22) PCT Filed: Feb. 4, 2015

(86) PCT No.: PCT/CN2015/072201
§ 371 (c)(1),
(2) Date: Jun. 3, 2016

(87) PCT Pub. No.: WO2015/085961
PCT Pub. Date: Jun. 18, 2015

(65) Prior Publication Data
US 2016/0308997 A1    Oct. 20, 2016

(30) Foreign Application Priority Data
Dec. 9, 2013  (CN) .......................... 2013 1 0661820

(51) Int. Cl.
  *H04L 29/08*    (2006.01)
  *G06F 17/30*    (2006.01)
(52) U.S. Cl.
  CPC ...... *H04L 67/306* (2013.01); *G06F 17/30867* (2013.01); *H04L 67/22* (2013.01)
(58) Field of Classification Search
  CPC ........................... H04L 67/306; H04K 67/306
  (Continued)

(56) References Cited

U.S. PATENT DOCUMENTS

| 6,389,020 B1 * | 5/2002 | Kim .................. H04Q 11/0478 370/395.6 |
| 8,209,390 B1 * | 6/2012 | Gibbs .................... H04L 51/28 709/206 |

(Continued)

FOREIGN PATENT DOCUMENTS

| CN | 101655856 A | * | 2/2010 |
| CN | 120646132 A |   | 8/2012 |

(Continued)

OTHER PUBLICATIONS

Merriam-Webster, "processor", 2014.*

(Continued)

*Primary Examiner* — O. C. Vostal
(74) *Attorney, Agent, or Firm* — Brinks Gilson & Lione

(57) ABSTRACT

A personal construction method and device are provided, the method includes: obtaining log information of a user; filtering the log information to obtain a key field of the log information; extracting a tag identifier of the key field; obtaining tag information based on the tag identifier and the key field, wherein the tag information comprises the number of times the tag identifier appears within a first predetermined time period; determining a category of interest corresponding to the identifier information based on the tag identifier; and obtaining a user interest degree corresponding to the category of interest based on the tag information.

18 Claims, 10 Drawing Sheets

(58) Field of Classification Search
USPC .......................................................... 709/204
See application file for complete search history.

(56) References Cited

U.S. PATENT DOCUMENTS

| | | | | |
|---|---|---|---|---|
| 8,590,039 | B1* | 11/2013 | Muttik | H04L 63/1416 |
| | | | | 726/22 |
| 8,904,025 | B2* | 12/2014 | Bouchard | H04L 47/26 |
| | | | | 709/229 |
| 8,996,429 | B1* | 3/2015 | Francis, Jr. | G06F 17/303 |
| | | | | 706/12 |
| 9,361,627 | B2* | 6/2016 | Chang | |
| 2003/0191720 | A1* | 10/2003 | Wibisono | H04L 67/104 |
| | | | | 705/54 |
| 2003/0225785 | A1* | 12/2003 | Arellano | G06F 17/30702 |
| 2003/0233336 | A1 | 12/2003 | Clark | |
| 2005/0114739 | A1 | 5/2005 | Gupta et al. | |
| 2005/0195660 | A1* | 9/2005 | Kavuri | G06F 3/0605 |
| | | | | 365/189.05 |
| 2008/0027924 | A1* | 1/2008 | Hamilton | G06F 17/30867 |
| 2008/0306809 | A1* | 12/2008 | Kwak | G06Q 30/02 |
| | | | | 705/14.54 |
| 2009/0228357 | A1 | 9/2009 | Turakhia | |
| 2010/0185518 | A1* | 7/2010 | Higgins | G06Q 30/02 |
| | | | | 705/14.58 |
| 2010/0228767 | A1* | 9/2010 | Slinker | G06Q 10/00 |
| | | | | 707/769 |
| 2010/0241507 | A1* | 9/2010 | Quinn | G06Q 30/02 |
| | | | | 705/14.42 |
| 2010/0275130 | A1* | 10/2010 | McBride | G06Q 10/10 |
| | | | | 715/751 |
| 2010/0318527 | A1 | 12/2010 | Nandy et al. | |
| 2011/0288939 | A1* | 11/2011 | Elvekrog | G06Q 30/0269 |
| | | | | 705/14.67 |
| 2012/0042263 | A1* | 2/2012 | Rapaport | G06Q 50/01 |
| | | | | 715/753 |
| 2012/0179752 | A1* | 7/2012 | Mosley | G06Q 10/10 |
| | | | | 709/204 |
| 2013/0046854 | A1* | 2/2013 | Shuster | G06T 19/20 |
| | | | | 709/217 |
| 2013/0139241 | A1* | 5/2013 | Leeder | H04W 12/06 |
| | | | | 726/9 |
| 2014/0095852 | A1* | 4/2014 | Levi | G06F 9/44 |
| | | | | 713/1 |
| 2014/0123031 | A1* | 5/2014 | Postrel | H04L 65/403 |
| | | | | 715/753 |
| 2014/0279454 | A1* | 9/2014 | Raman | H04L 63/08 |
| | | | | 705/40 |
| 2014/0324827 | A1* | 10/2014 | Hanses | G06F 17/30722 |
| | | | | 707/722 |
| 2014/0337112 | A1* | 11/2014 | Dessert | G06Q 30/0267 |
| | | | | 705/14.23 |
| 2015/0082371 | A1* | 3/2015 | DeWeese | H04L 63/10 |
| | | | | 726/1 |
| 2016/0248707 | A1* | 8/2016 | McCorry | H04L 51/04 |

FOREIGN PATENT DOCUMENTS

| | | |
|---|---|---|
| CN | 102737120 A | 10/2012 |
| CN | 104090886 A | 10/2014 |

OTHER PUBLICATIONS

Written Opinion of the International Searching Authority received in PCT Application No. PCT/CN2015/072201 dated Apr. 28, 2015.
International Search Report received in PCT Application No. PCT/CH2015/072201 dated Dec. 9, 2013.
First Chinese Office Action received in Chinese Patent Application No. 201310661820.0 dated Feb. 16, 2015.

* cited by examiner

USER PROFILE CONFIGURING METHOD AND DEVICE

This application is the US national phase of International Application No. PCT/CN2015/072201, filed on Feb. 4, 2015, which claims priority to Chinese Patent Application No. 201310661820.0 titled "USER PROFILE CONFIGURING METHOD AND DEVICE" and filed with the Chinese State Intellectual Property Office on Dec. 9, 2013, which are incorporated herein by reference in their entireties.

FIELD

The present disclosure relates to the technical field of data processing, and especially to a persona construction method and apparatus.

BACKGROUND

With the rapid development of network technology, the internet has become a platform for users to share information. Thus, there is massive data information in the internet. Under this circumstance, users always get lost in massive low-value data information. Thus, how to recommend data information of interest to a user for the user has become a technical problem. A key technology for recommending data information for a user is constructing a persona for the user, and a persona is a synthetic analysis of behavior attributes and basic attributes of the user. The behavior attributes of the user may include behavior logs of browsing and purchasing a certain commodity, and the basic attributes of the user may include a gender and an age. By analyzing interest degrees of the user for different commodity categories and modeling the user, data information is recommended for the user based on the user profile. Thus, how to construct a persona has become an urgent issue for those in the art to address.

In the process of building a persona, a computation is performed based on a Hadoop batch processing system, which is generally performed in the two following ways: the first, obtaining and storing log information of a user, and constructing a persona based on the log information of the user when the quantity of the log information of the user reaches a threshold; and the second, obtaining and storing log information of a user and constructing a persona based on the log information of the user by a predetermined period.

Following problems are found in conventional technology by the inventor in the process of bringing about the disclosure.

In either of the two ways for building a persona, the persona can be constructed only after waiting a certain period of time, which results in a bad timelines, and a precision of recommending data information for the user based on the persona constructed is not high. In addition, since the persona is constructed after waiting a certain period of Lime, batch processing on log information is required in constructing the persona, which results in a long processing time, a complex process and a large amount of computation.

SUMMARY

In order to solve the problems in conventional technology, a persona construction method and a persona construction apparatus are provided according to the present disclosure which includes the following technical solutions.

In an aspect, a persona construction method is provided, which includes:

obtaining log information of a user;

filtering the log information, to obtain a key field of the log information;

extracting a tag identifier of the key field;

obtaining tag information based on the tag identifier and the key field, where the tag information includes the number of times the tag identifier appears within a first predetermined time period;

determining all categories of interest corresponding to the identifier information based on the tag identifier; and obtaining a user interest degree corresponding to each of the categories of interest based on the tag information.

In another aspect, a persona construction apparatus is provided, which includes:

a log information obtaining module, configured to obtain log information of a user;

a filtering module, configured to filter the log information obtained by the log information obtaining module, to obtain a key field of the log information;

an extracting module, configured to extract a tag identifier of the key field;

a tag information obtaining module, configured to obtain tag information based on the tag identifier obtained by the extracting module and the key field obtained by the filtering module through filtering, where the tag information includes the number of times the tag identifier appears within a first predetermined time period;

a determining module, configured to determine all categories of interest corresponding to the identifier information based on the tag identifier extracted by the extracting module; and a user interest degree obtaining module, configured to obtain a user interest degree corresponding to each of the categories of interest based on the tag information obtained by the tag information obtaining module.

The technical solutions according to the present disclosure have the following beneficial effects:

the key field is obtained by filtering the log information obtained, the tag identifier of the key field is extracted, the tag information is obtained based on the tag identifier and the key field, and thereby, the user interest degree corresponding to each of the categories of interest is obtained based on the current identifier information after determining all the categories of interest corresponding to the tag information, thus achieving rebuilding a real-time persona for the user after obtaining a piece of log information of the user, so that precise data information can be recommended for the user based on the real-time persona of the user, which has a good timeliness and improves the user experience.

BRIEF DESCRIPTION OF THE DRAWINGS

The drawings to be used in the descriptions of embodiments are described briefly as follows, so that technical solutions according to the embodiments of the disclosure may become clearer. Apparently, the drawings in the following descriptions only illustrate some embodiments of the disclosure. For those in the art, other drawings may be obtained based on these drawings without any creative work.

FIG. 12 is an overall structural diagram of a persona construction system according to a fourth embodiment of the;

DETAILED DESCRIPTION

Some embodiments of the present disclosure are described hereinafter in conjunction with the drawings, so that the objective, technical solutions and advantages of the invention may be become clearer.

A persona construction method according to the present disclosure is implemented based on a Storm (storm) stream computing platform. Before describing the present disclosure in detail, the Storm stream computing platform is described hereinafter.

The Storm stream computing platform is an open-source and real-time computing platform, which has the features of real-time, distributivity and high fault-tolerance. Essentially, the Storm stream computing platform is a message processing network consisting of a processor and a message queue. It provides a series of real-time computational primitives, so that developers can focus on development to service functions, regardless of complex businesses such as message queue maintenance, fault detection and cluster management.

Figure 1:
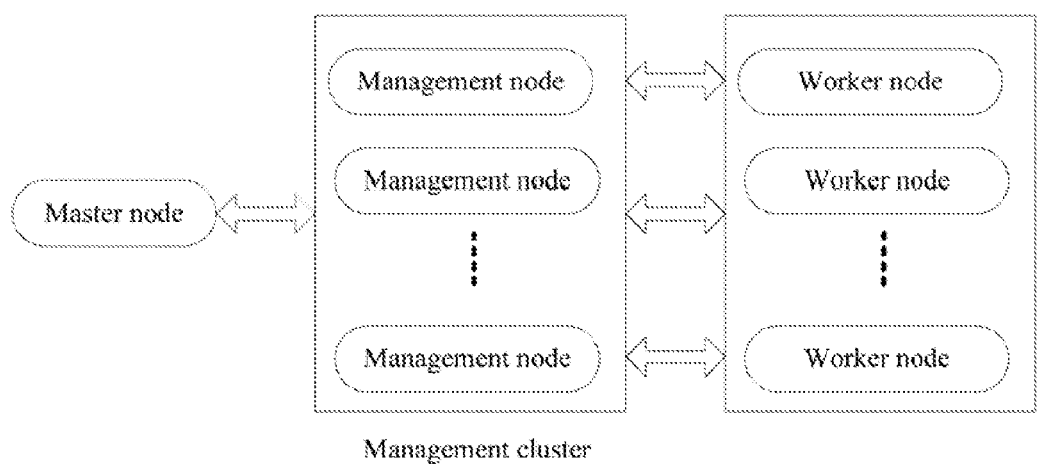
FIG. 1 is an overall block diagram of a Storm cluster according to the present disclosure.

As shown in FIG. 1, the Storm stream computing platform is implemented through a Storm cluster. The Storm cluster includes one master node (master node) and multiple worker nodes (worker nodes). Coordination between the master node and the multiple worker nodes is performed by a management cluster (zookeeper). The master node runs a background program (Nimbus), which is used to distribute codes, assign tasks, monitor statuses of the multiple worker nodes and handle malfunctions. Each of the worker nodes runs a background program (Supervisor), which is used to monitor whether there is a task assigned, start a work process in a case there is a task assigned and end a work process in a case that a task of ending the work process is received. The status of the background program in the master node and the status of the background program in each of the multiple worker nodes are stored in the management cluster. In a case that the background program in the master node or a process in the worker nodes dies accidently, the management cluster can quickly restart the process based on the status of the background program in the master node or in each of the worker nodes.

Figure 2:
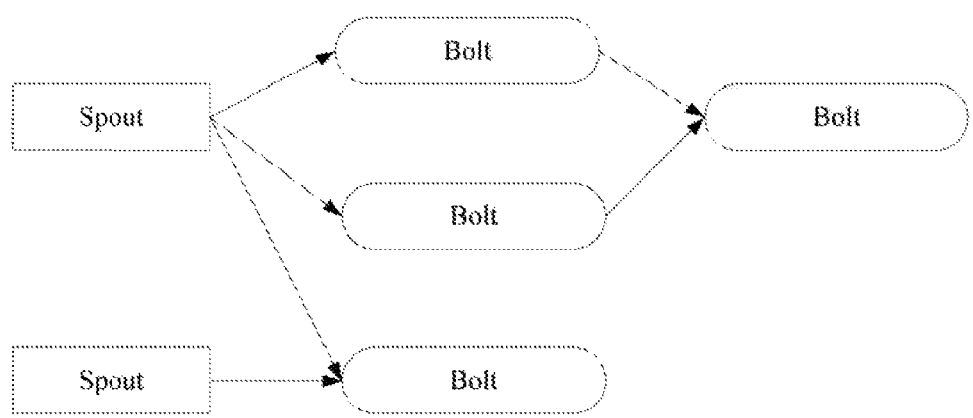
FIG. 2 is a schematic diagram of a topological structure according to the present disclosure.

In order to perform a real-time computation in the Storm stream computing platform, a logic for implementing an application program is encapsulated in a network topology in the Storm stream computing platform. As shown in FIG. 2, the network topology is a topological structure including a group of spouts (spouts) and bolts (bolts) connected through message queues. Each of the nodes in the network topology includes a logic, and connections between the nodes represent directions in which data flows. The spouts are the source of the whole network, which may obtain data from data sources such as databases, files and log systems. There are two types of spouts, reliable spouts and unreliable spouts. For a scenario where data reliability is required, the spouts can trace whether data sent is processed successfully. If the data is not processed successfully, the spouts can capture the situation and perform appropriate processing, for example, resending the data. For scenarios data reliability is not highly required and a minor data loss is allowable, the spouts only simply send data without tracing subsequent processing of the data. The data reliability is at the expense of occupying more machine resources and reducing machine performance, and developers may make a choice based on service features. Further, one spout may send multiple data streams, and a bolt which receives the data streams may self-adaptively choose a data stream to process. All data processing operations in the network topology are performed by the bolts. The bolts can filter and aggregate data and access files or databases. In the process of receiving data sent from the spouts and processing the data, a bolt may process the data and send the process result to another bolt for further processing if the data process is complicated. A bolt may also send multiple data streams, and other bolt may only process a data stream of interest to itself. Further, parallelism may be set on the spouts and the bolts in the network topology in the Storm stream computing platform, so that the parallelism can be improved in a case existing spouts and bolts fail to normally process data streams.

Embodiment 1

Figure 3:
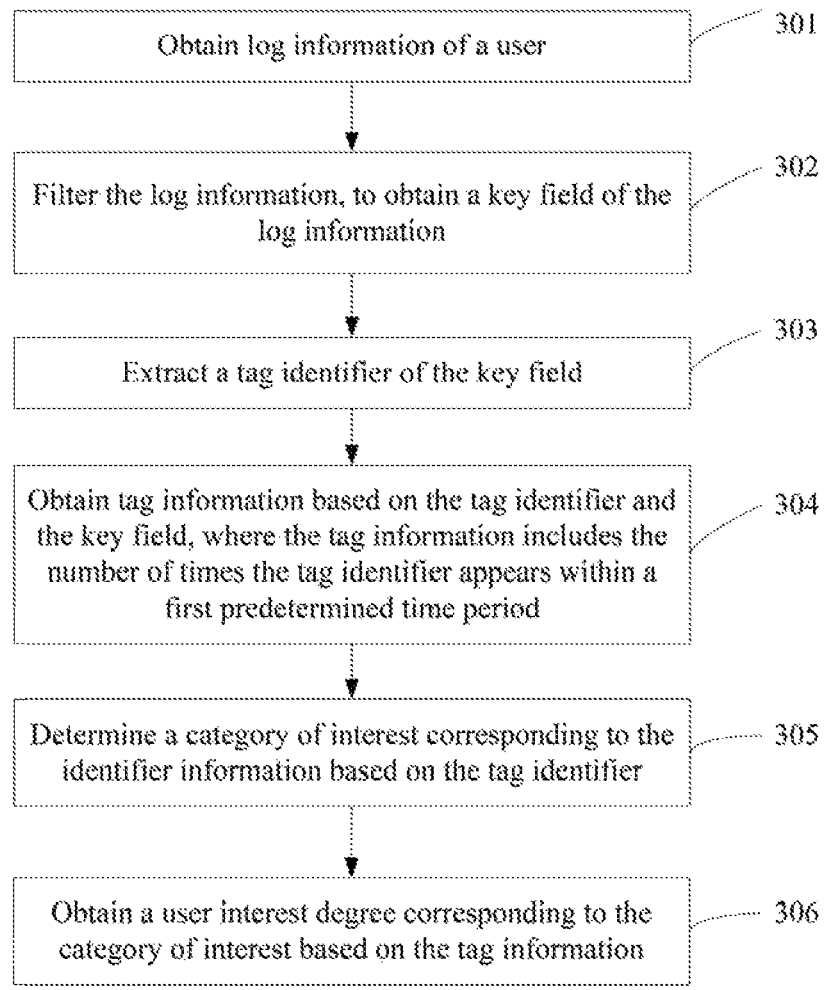
FIG. 3 is a flowchart of a persona construction method according to a first embodiment of the present disclosure.

A persona construction method is provided according to the embodiment of the present disclosure, and the method is described in conjunction with the descriptions above. As shown in FIG. 3, the persona construction method according to the embodiment includes steps 301 to 306.

Step 301 includes obtaining log information of a user.

Step 302 includes filtering the log information, to obtain a key field of the log information.

In an embodiment, the key field may at least include a user identifier, a generating time of the log information, a data source identifier of the log information and a product identifier.

Step 303 includes extracting a tag identifier of the key field.

In an embodiment, extracting a tag identifier of the key field may include:

detecting whether the key field includes a behavior category identifier;

in a case that the key field includes a behavior category identifier, determining the behavior identifier to be the tag identifier; and in a case that the key filed does not include a behavior category identifier, obtaining a product title corresponding to the product identifier based on the product identifier in the key field and extracting the tag identifier based on the product title.

In an embodiment, extracting the tag identifier of the key field based on the product title may include:

performing segmentation on the product title according to a preset grammar rule, to obtain multiple segmentation results of the product title; and filtering and analyzing the multiple segmentation results according to a preset filtering condition, to obtain a filtering result, and extracting the filtering result as the tag identifier.

Step 304 includes obtaining tag information based on the tag identifier and the key field, where the tag information includes the number of times the tag identifier appears within a first predetermined time period.

In an embodiment, obtaining tag information based on the tag identifier and the key field may include:

detecting whether the tag information obtained matches at least one of multiple pieces of tag information pre-stored;

in a case that the tag information obtained matches at least one of the multiple pieces of tag information pre-stored, determining that the at least one of the multiple pieces of tag information to be matched tag information, and determining whether the generating time of the log information corresponding to the tag identifier matches any of multiple predetermined time periods in the matched tag information;

in a case that the generating time of the log information matches one of the multiple predetermined time periods, updating the number of times the tag identifier appears within the one of the multiple predetermined time periods; and in a case that the generating time of the log information does not matches any of the multiple predetermined time periods, creating a storage item based on the generating time of the log information and counting the number of times the tag identifier extracted appears within the generating time of the log information.

In an embodiment, the tag information may further include a tag identifier and an extraction type of the tag identifier.

In an embodiment, detecting whether the tag information obtained matches at least one of the pieces of tag information pre-stored includes:

detecting whether the tag identifier of the tag information obtained and the extraction type of the tag identifier are identical with the tag identifier of the at least one of the multiple pieces of tag information pre-stored and an extraction type of the tag identifier respectively.

In an embodiment, after detecting whether the tag information obtained matches at least one of the pieces of tag information pre-stored, the method further includes:

in a case that the tag information obtained does not match any of the pieces of tag information pre-stored, determining the user identifier and the data source identifier of the log information in the key field as a key, determining the tag identifier, the extraction type of the tag identifier and the number of times the tag identifier appears within the first predetermined time period as a value and storing the key and the value correspondingly, to obtain the tag information.

In an embodiment, the method further includes:

deleting a predetermined time period, which is stored longer than a second threshold, in multiple predetermined time periods; and deleting the number of times the tag identifier appears within the deleted predetermined time period.

Step 305 includes determining all categories of interest corresponding to the identifier information based on the tag identifier.

Step 306 includes obtaining a user interest degree corresponding to each of the categories of interest based on the tag information.

In an embodiment, obtaining a user interest degree corresponding to each of the categories of interest based on the tag information may include:

obtaining multiple pieces of history tag information corresponding to each of the categories of interest;

determining weights of data sources, weights of the categories of interest, the numbers of times the tag identifier appears within the first predetermined time period and time attenuation factors corresponding to current tag information and the multiple pieces of history tag information, respectively; and obtaining the user interest degree corresponding to each of the categories of interest, based on the weights of data sources, the weights of the categories of interest, the numbers of times the tag identifier appears within the first predetermined time period and the time attenuation factors corresponding to the current tag information and the multiple pieces of history tag information, respectively.

In an embodiment, obtaining the user interest degree corresponding to each of the categories of interest, based on the weights of data sources, the weights of the categories of interest, the numbers of times the tag identifier appears within the first predetermined time period and the time attenuation factors corresponding to the current tag information and the multiple pieces of history tag information, respectively may include calculating the user interest degree corresponding to each of the categories of interest according to the following formula:

$$Score = \cfrac{1}{1 + \gamma * \exp\left[\cfrac{-\sum_{i=0}^{i=m}\left(\lambda(i) * \sum_{j=0}^{j=n}\left(w(j) * \sum_{t=0}^{t=k}\left(\begin{array}{c}weakenFactor(t) *\\count(t)\end{array}\right)\right)\right)}{b}\right]},$$

where Score represents an interest degree, $\lambda(i)$ represents a weight of a data source corresponding to each piece of tag information, $w(j)$ represents a corresponding weight of a piece of tag information in each of the categories of interest, weakenFactor(t) represents a time attenuation factor, count (t) represents the number of times the tag identifier appears within the first predetermined time period, m represents the number of the data sources, n represents the number of pieces of tag information corresponding to each of the data sources, and $\gamma$ and b are both constants.

In the method according to the embodiment, the key field is obtained by filtering the log information obtained, the tag identifier of the key field is extracted, the tag information is obtained based on the tag identifier and the key field, and thereby, the user interest degree corresponding to each of the categories of interest is obtained based on the current identifier information after determining all the categories of interest corresponding to the tag information, thus achieving constructing a real-time persona a user after obtaining a piece of log information of the user, so that precise data information can be recommended for the user based on the real-time persona of the user, which has a good timeliness and improves the user experience.

Embodiment 2

Figure 4:
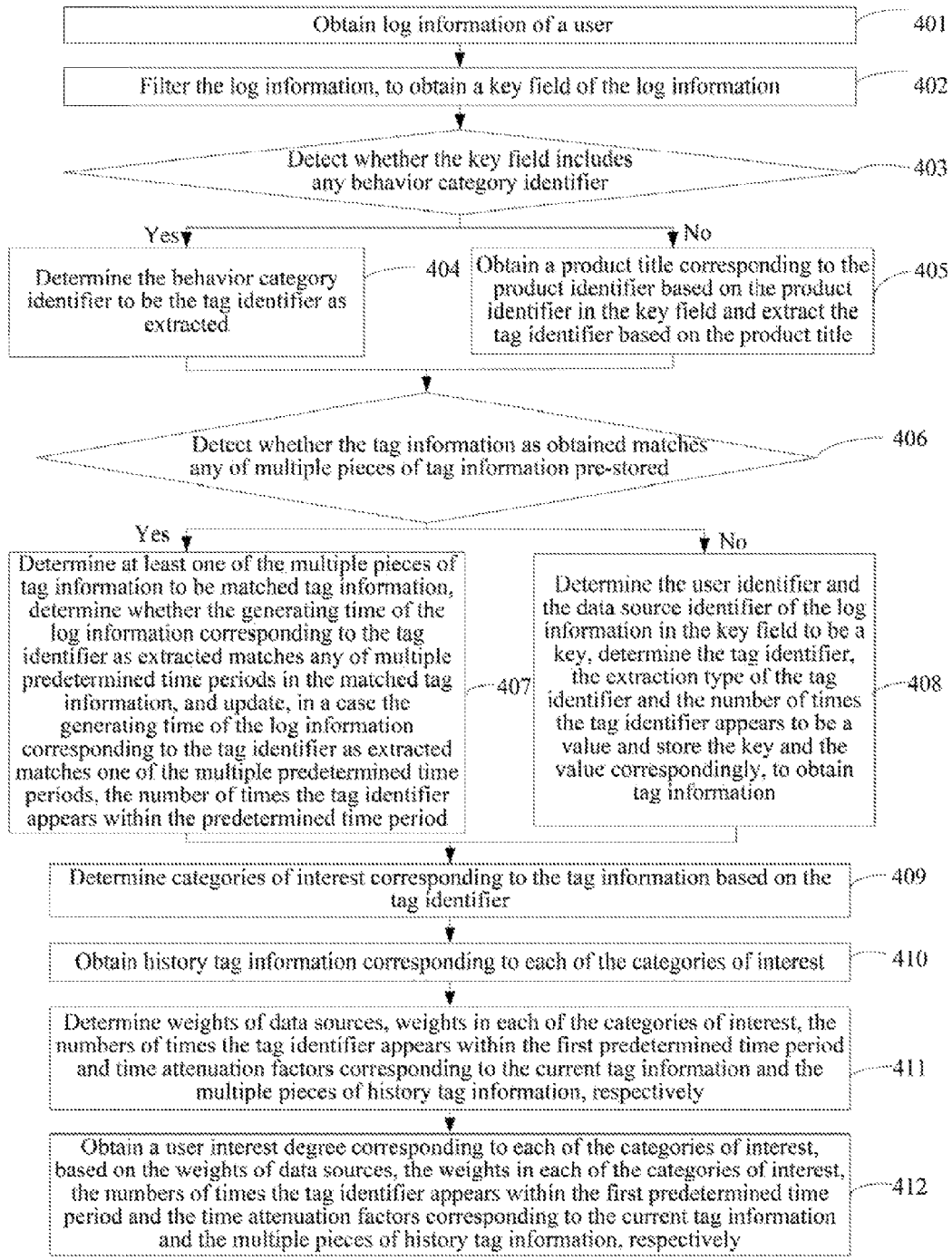
FIG. 4 is a flowchart of a persona construction method according to a second embodiment of the present disclosure.

A persona construction method is provided according to the embodiment of the present disclosure, which is described hereinafter in detail in conjunction with the descriptions above of the Storm stream computing platform and the first embodiment above. As shown in FIG. 4, the method according to the embodiment of the present disclosure includes steps 401 to 412.

Step 401 includes obtaining log information of a user.

In order to obtain the log information of users, data subscription of various data sources is required before obtaining the log information of the users. That is, only subscribing data of a data source, log data of a user can be obtained from the data source, and then the log data of the user can be parsed, to obtain the log information of the user.

In an embodiment, after the log information of the user is obtained, the log information obtained of the user is stored in a local message buffer queue. The local message buffer queue is a blocking queue, where only a predetermined amount of log information can be stored at most. In a case that the amount of log information in the local message buffer queue reaches the predetermined amount after obtaining the log information of the user, the log information of the user obtained can not be stored in the local message buffer queue until there is a vacancy in the local message buffer queue.

Step 402 includes filtering the log information, to obtain a key field of the log information.

The key field may at least include a user identifier, a time when the log information generates, a data source identifier of the log information and a product identifier.

A method for filtering the log information may include but is not limited to: determining whether the log information includes a dirty field; filtering the log information, to obtain the key field of the log information, in a case that the log information does not include a dirty field; and abandoning the log information and terminating the processing flow, in a case that the log information includes a dirty field.

It should be noted that log information often includes some dirty fields, i.e., invalid fields, for example, a field with an invalid format or a field of which the keyword is missing. Since a dirty field does not contribute to the process later of obtaining a user interest degree, log information including a dirty field can be abandoned for purposes of saving storage space and removing redundant data.

Further, the user identifier in the key field is used to identify the user corresponding to the log information. Since generation of the log information can be triggered when the user performs an operation such as browsing, purchasing, following or collecting a product in webpages corresponding to various data sources, the generating time of the log information in the key field is used to indicate a time when the user performs the operation above such as browsing, purchasing, following or collecting the product. And the data source identifier of the log information in the key field is used to indicate the data source corresponding to a webpage where the user performs the operation such as browsing, purchasing, following or collecting the product. And the product identifier in the key field is used to indicate a product the user browses, purchases, follows or collects.

In addition to the user identifier, the generating time of the log information, the data source identifier of the log information and the product identifier, the key field may further include a behavior category identifier, and contents included in the key field are not limited in the embodiment.

The behavior category identifier is used to indicate a category a product corresponding to the product identifier belongs to. For example, in a case that the product corresponding to the product identifier is "sweater", the behavior category identifier may be "upper garment" or "clothes". For example, in a case that the product corresponding to the product identifier is "laundry detergent", the behavior category identifier may be "daily chemical product".

Step 403 includes detecting whether the key field includes a behavior category identifier, performing step 404 in a case that the key field includes a behavior category identifier, and performing step 405 in a case that the key field does not include a behavior category identifier.

Before extracting a tag identifier of the key field, it is determined whether the key field includes a behavior category identifier. A method for detecting whether the key field includes a behavior category identifier includes but is not limited to: presetting and storing multiple types of behavior category identifiers; and detecting whether the key field includes any of the multiple types of behavior category identifiers stored. It is determined that the key field includes a behavior category identifier in a case that the key field includes any of the multiple types of behavior category identifiers stored.

Step 404 includes determining the behavior category identifier to be the tag identifier extracted.

In a case the key field includes a behavior category identifier, the behavior category identifier is determined to be the tag identifier obtained of the key field. In a case a behavior category identifier of a key field is "sweater", a tag identifier of the key field is "sweater" as well.

Step 405 includes obtaining a product title corresponding to the product identifier based on the product identifier in the key field and extracting the tag identifier based on the product title.

In a case that the key field does not include a behavior category identifier, the product title corresponding to the product identifier is obtained based on the product identifier in the key field, and the tag identifier of the key field is extracted based on the product title.

The product title is detailed descriptive information of a product. For example, for a sweater product, a product title thereof may be "autumn and winter new-style Korean sweater". A table of correspondence relations between product identifiers and product titles obtained from data sources in advance is stored in a database. Thus, in obtaining the product title corresponding to the product identifier based on the product identifier in the key field, the table of correspondence relations between product identifiers and product titles in the database can be referred to based on the product identifier, to obtain the product title corresponding to the product identifier.

Besides, a method for extracting the tag identifier of the key field includes but is not limited to: performing segmentation on the product title according to a preset grammar rule, to obtain multiple segmentation results of the product title; filtering and analyzing the multiple segmentation results according to a preset filtering condition; and extracting, in a case that a filtering result is obtained, the filtering result as the tag identifier of the key field. In addition, the filtering process is terminated in a case that no filtering result is obtained.

The preset grammar rule includes but is not limited to the grammar rule of Chinese and the grammar rule of English.

The preset filtering condition may include: filtering out pure digits, pure dates, overlong continuous English, Chinese-English-combined words and non-nominal single Chinese characters; filtering out adverbs, function words and adjectives; and filtering out words with small weights and Chinese characters within a predetermined range in the Chinese internal code specification.

For example, in a case that a product title is "autumn and winter new-style Korean sweater", in performing the segmentation, the product title "autumn and winter new-style Korean sweater" is segmented into four segments, "autumn and winter". "new-style", "Korean" and "sweater". Since "autumn and winter", "new-style", "Korean" and "sweater" are all adjectives and only "sweater" is a noun, the tag identifier is determined to be "sweater".

It should be noted that steps 404 and 405 above are two methods for extracting the tag identifier of the key field, and extracting the tag identifier of the key field is described in detail in steps 404 and 405. And the following step 406 is performed after either of steps 404 and 405 is performed.

Step 406 includes detecting whether the tag information obtained matches at least one of multiple pieces of tag information pre-stored, if yes, proceeding to step 407, otherwise proceeding to step 408.

In an embodiment, detecting whether the tag information obtained matches at least one of multiple pieces of tag information pre-stored may include the following: detecting whether the tag identifier of the tag information and an extraction type of the tag identifier are identical with a tag identifier of the at least one of the multiple pieces of tag information pre-stored and an extraction type of the tag identifier respectively. In a case that the tag identifier of the tag information and the extraction type of the tag identifier are identical with the tag identifier of the at least one of the multiple pieces of tag information pre-stored and the extraction type of the tag identifier respectively, it is determined that the tag information obtained matches the at least one of the multiple pieces of tag information pre-stored.

The tag information includes the tag identifier and the extraction type of the tag identifier. The extraction type of the tag information includes but is not limited to an extraction type of behavior category identifier and an extraction type of product title.

Step 407 includes: determining the at least one of the multiple pieces of tag information to be matched tag information, and determining whether the generating time of the log information corresponding to the tag identifier extracted matches any of multiple predetermined time periods in the matched tag information; and updating, in a case that the generating time of the log information corresponding to the tag identifier extracted matches one of the multiple predetermined time periods, the number of times the tag identifier appears within the one of the multiple predetermined time periods.

Figures 5, 6:
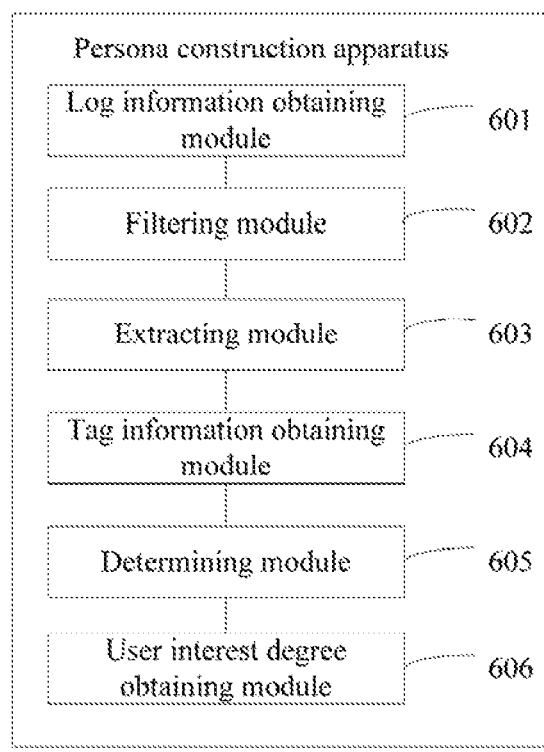
FIG. 5 is schematic diagram of according to the second embodiment of the invention.
FIG. 6 is a structural diagram of a persona construction device according to a third embodiment of the present disclosure.

The length of each of the multiple predetermined time periods may be but is not limited to one day or one hour. As shown in FIG. 5, each of the multiple pieces of tag information includes a user identifier, a data source identifier, a tag identifier, an extraction type of the tag identifier and the number of times the tag identifier appears in the first predetermined time period. Since the generation of log information may be triggered when the user performs an operation such as browsing, purchasing, following or collecting a product in webpages corresponding to various data sources, a server can obtain the log information. Since a key field obtained by filtering the log information corresponds to a tag identifier, a user identifier and a data source identifier, it can be detected whether there is tag information including the tag identifier and an extraction type of the tag identifier in the multiple pieces of tag information pre-stored, after extracting the tag identifier of the user. For example, the tag identifier extracted is "sweater", the extraction type of the tag identifier is a product title and a time period corresponding to the tag information is from 00:00 AM, Oct. 1, 2013 to 24:00 PM, Oct. 1, 2013. In a case that a tag identifier of one of the multiple pieces of tag information pre-stored is also "sweater" and an extraction type of the tag identifier is also a product title, the one of the multiple pieces of tag information is determined to be matched tag information. In a case that multiple predetermined time periods in the matched tag information includes the time period from 00:00 AM, Oct. 1, 2013 to 24:00 PM, Oct. 1, 2013, 1 is added to the number of times the tag identifier appears within the time period from 00:00 AM, Oct. 1, 2013 to 24:00 PM, Oct. 1, 2013, to indicate how many times the tag identifier appears within the time period from 00:00 AM, Oct. 1, 2013 to 24:00 PM, Oct. 1, 2013, i.e., how many operations such as browsing, purchasing, following or collecting a product the user performs.

Further, in a case that the generating time of the log information corresponding to the tag identifier extracted does not match any of the multiple predetermined time periods, a separate storage item is created based on the generating time of the log information corresponding to the tag identifier and the number of times the tag identifier appears within the generating time of the log information corresponding to the tag identifier is counted.

In the example above, in a case that the time period from 00:00 AM, Oct. 1, 2013 to 24:00 PM, Oct. 1, 2013 is not included in the multiple predetermined time periods, a separate storage item is created based on the time period from 00:00 AM, Oct. 1, 2013 to 24:00 PM, and the number of times the tag identifier appears within the generating time of the log information corresponding to the tag identifier is counted, to indicate how many times the tag identifier appears within the time period from 00:00 AM, Oct. 1, 2013 to 24:00 PM, Oct. 1, 2013, i.e., how many operations such as browsing, purchasing, following or collecting a product the user performs.

Further, for a consideration of storage space limit, the method according to the embodiment further includes:

deleting a predetermined time period, which has been stored longer than a second threshold, from the multiple predetermined time periods; and deleting the number of times the tag identifier appears within the deleted predetermined time period.

There is a correspondence between a predetermined duration and a predetermined time period. In a case the predetermined duration is in units of days, the predetermined duration may be set to be 30 days; and in a case the predetermined time period is in units of hours, the predetermined duration may be set to be 24 hours.

By maintaining the tag information at intervals of predetermined time periods, such as days or hours, the tag information stored can be used to indicate the number of times the tag identifier appears within a sliding time window, perform a sliding update and delete out-of-date data.

Step 408 includes determining the user identifier and the data source identifier of the log information in the key field as a key, determining the tag identifier, the extraction type of the tag identifier and the number of times the tag identifier appears as a value and storing the key and the value correspondingly, to obtain the tag information.

In a case that the tag identifier and the extraction type of the tag identifier are not included in the multiple pieces of tag information pre-stored, it is indicated that the tag identifier is a totally new tag identifier, which needs to be stored independently. In storing, the storage form of key-value (key-value) is used in the method according to the embodiment, where the user identifier and the data source identifier of the log information are stored as the key and the tag identifier, the extraction type of the tag identifier and the number of times the tag identifier appears are stored as the value, to obtain current tag information. Reference can be made to FIG. 5 for a specific storage form of the current tag information.

It should be noted that steps 407 and 408 above are two methods for obtaining the current tag information, and the obtaining the current tag information is described in detail in steps 407 and 408. And the following step 409 is performed after either of steps 407 and 408 is performed.

Step 409 includes determining categories of interest corresponding to the tag information based on the tag identifier.

There may be various categories of interest, which may include but are not limited to electronic product, clothes, maternal and baby product, daily chemical product, kitchenware, and fruit and vegetable. Besides, each category of interest may correspond to multiple tag identifiers. For example, in a case a category of interest is clothes, tag identifiers corresponding to the category of interest of clothes may include but are not limited to sweater, pant, down jacket, underwear and windbreaker.

It should be noted that one tag identifier may correspond to multiple categories of interest. For example, in a case that a tag identifier is "apple", the tag identifier may represent a mobile terminal device, or a fruit. Thus, the tag identifier corresponds to two categories of interest.

Besides, the database can set each of the categories of interest based on the type of a product in advance, set all tag identifiers corresponding to each of the categories of interest and store a correspondence between categories of interest and tag identifiers. Thus, in determining all the categories of interest corresponding to the current tag information based on the tag identifier, a search can be directly performed on the correspondence relation stored between categories of interest and tag identifiers based on the tag identifier of the current tag information, to determine at least one category of interest corresponding to the current tag information.

Step 410 includes obtaining history tag information corresponding to each of the categories of interest.

Since each piece of history information includes a tag identifier and each of the categories of interest includes multiple tag identifiers, a method for obtaining multiple pieces of history tag information corresponding to each of the categories of interest may include the following:

for a category of interest, going through all tag information of the user, obtaining all pieces of tag information, included in the category of interest, of the tag identifier and determining all the pieces of tag information, included in the category of interest, of the tag identifier to be the multiple pieces of history tag information corresponding to the category of interest.

Step 411 includes determining weights of data sources, weights in each of the categories of interest, the numbers of times the tag identifier appears within the first predetermined time period and time attenuation factors corresponding to the current tag information and the multiple pieces of history tag information.

For a piece of tag information, a weight of a corresponding data source and a weight in a corresponding category of interest can be obtained from a table of weights of data sources and a table of weights of tag information in categories of interest. The numbers of times the tag identifier appears can be obtained from corresponding tag information. And a time attenuation factor weakenFactor(t) may be obtained according to the calculation formula below:

$$weakenFactor(t) = \exp[-i*h/k] \quad (1),$$

where h=2.5, k represents based on data of how many past days a user interest degree is obtained in a case the predetermined time period is in unit of days, for example, where k=m represents the calculation is based on data of a current day and m past days, and t represents the number of days between a history day and a current day, where, for example, the number of days between today and yesterday is 1.

Step 412 includes obtaining the user interest degree corresponding to each of the categories of interest, based on the weights of data sources, the weights in each of the categories of interest, the numbers of times the tag identifier appears within the first predetermined time period and the time attenuation factors corresponding to the current tag information and the multiple pieces of history tag information.

After obtaining the current tag information, the obtaining of a user interest degree is triggered once. The number of categories of interest the current tag information corresponds to is the same as the number of user interest degrees to be obtained, and each of the user interest degrees corresponds to one category of interest.

In an embodiment, the user interest degree corresponding to each of the categories of interest may be obtained according to the following formula:

$$Score = \frac{1}{1 + \gamma * \exp\left[-\sum_{i=0}^{i=m}\left(\lambda(i) * \sum_{j=0}^{j=n}\left(w(j) * \sum_{t=0}^{t=k}\left(\frac{weakenFactor(t) *}{count(t)}\right)\right)\right)\right]} \quad (2)$$

Score represents an interest degree;

λ(i) represents a weight of a data source, which can be set by experience, where weights of different data sources are different;

w(j) represents a corresponding weight of a piece of tag information in a each of the categories of interest, which can be obtained by offline model training; and count(t) represents the number of times the tag identifier appears within the first predetermined time period, m represents the number of the data sources, n represents the number of pieces of tag information corresponding to each of the data sources, and γ and b are both constants, where γ=3, b=25, and m, n depend on the number of the data sources and the number of pieces of tag information corresponding to each of the data sources, respectively.

It should be noted that the obtaining the user interest degree corresponding to each of the categories of interest based on the current tag information is described in detail in steps 410, 411 and 412 above. In order to more clearly describe how the user interest degree is obtained, the obtaining the user interest degree corresponding to each of the categories of interest based on the current tag information is described in detail in the three steps above.

Further, after step 412, the method according to the embodiment may further include recommending information on a product for the user based on the user interest degree obtained on detecting an instruction operation of the user. The recommending information on the product may be performed by providing a data link, a thumbnail and a name of the product. For example, in a case the user currently browses information on "sweater" and a corresponding category thereof is "upper garment", the obtaining of a user interest degree corresponding to the category of interest of "upper garment" is triggered. In a case a score of the user interest degree corresponding to the category of interest of "upper garment" is high, information on newest and most popular upper garment products is recommended for the user.

In the method according to the embodiment, the key field is obtained by filtering the log information obtained, the tag identifier of the key field is extracted, the tag information is obtained based on the tag identifier and the key field, and thereby, the user interest degree corresponding to each of the categories of interest is obtained based on the current identifier information after determining all the categories of interest corresponding to the tag information, thus achieving rebuilding a real-time persona for the user after obtaining a piece of log information of the user, so that precise data information can be recommended for the user based on the real-time persona of the user, which has a good timeliness and improves the user experience.

In order to further show the beneficial effects of the method according to the embodiment of the disclosure, the following conclusions of network data tests may be made in conjunction with the network architecture shown in FIGS. 1 and 2. One machine serves as a master node, three machines serve as a management cluster, and four machines serve as worker nodes, where each machine is configured with a 4-core 64-bit Intel® Xeon® CPU @2.50 GHz and 8 G ram. And in a case a concurrence degree setting is spouts (ECC-Spout): tag identifier obtaining bolts (TagGetBolt): user interest degree bolts (TagInterestUpdateBolt)=2:2:10, a peak processing capability can reach 52,000 logs per second, which can meet service requirements at the current stage. Since the Storm stream computing platform has good expansibility, the throughput of the system can be improved by increasing the concurrence degree and capacities of machines in a case that the volume of service increases. In a case that the system accesses more data sources in following processes, it is only needed to add corresponding spouts once a data source is added, which is convenient in expansion.

Embodiment 3

A persona construction device is provided according to the embodiment of the present disclosure, which is used to perform the method according to the embodiment 1 or 2 above. As shown in FIG. 6, the apparatus includes:

a log information obtaining module 601, configured to obtain log information of a user, where the log information obtaining module 601 is connected to a filtering module 602; the filtering module 602, configured to filter the log information obtained by the log information obtaining module 601, to obtain a key field of the log information, where the filtering module 602 is connected to an extracting module 603; the extracting module 603, configured to extract a tag identifier of the key field obtained by the filtering module 602 through filtering, where the extracting module 603 is connected to a tag information obtaining module 604; the tag information obtaining module 604, configured to obtain tag information based on the tag identifier extracted by the extracting module 603 and the key field obtained by the filtering module 602 through filtering, where the tag information includes the number of times the tag identifier appears within a first predetermined time period, where the tag information obtaining module 604 is connected to a determining module 605; the determining module 605, configured to determine a category of interest corresponding to the tag information based on the tag identifier extracted by the extracting module 603, where the determining module 605 is connected to a user interest degree obtaining module 606; and the user interest degree obtaining module 606, configured to obtain a user interest degree corresponding to the category of interest based on the tag information obtained by the tag information obtaining module 604.

The key field at least includes a user identifier, a generating time of the log information, a data source identifier of the log information and a product identifier.

Figure 7:
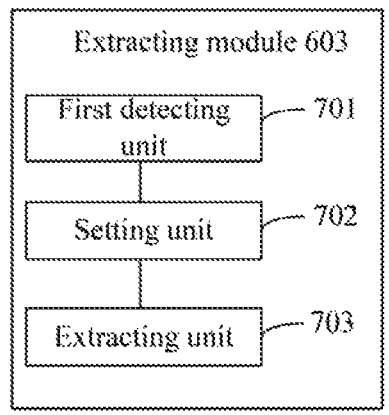
FIG. 7 is a structural diagram of an extracting module according to the third embodiment of the present disclosure.

In an embodiment, as shown in FIG. 7, the extracting module 603 may include:

a first detecting unit 701, configure to detect whether the key field includes a behavior category identifier;

a setting unit 702, configured to determine, in a case that the key field includes a behavior category identifier, the behavior identifier as the tag identifier; and an extracting unit 703, configured to obtain a product title corresponding to the product identifier based on the product identifier in the key field and extract the tag identifier based on the product title, in a case that the first detecting unit 701 detects that the key field does not include a behavior category identifier.

Figure 8:
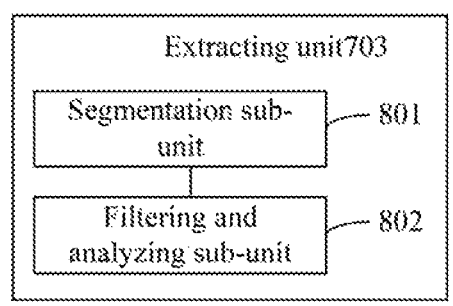
FIG. 8 is a structural diagram of an extracting unit according to the third embodiment of the present disclosure.

In an embodiment, as shown in FIG. 8, the extracting unit 703 includes:

a segmentation processing sub-unit 801, configured to perform segmentation on the product title according to a preset grammar rule, to obtain multiple segmentation results of the product title; and a filtering and analyzing sub-unit 802, configured to filter and analyze the multiple segmentation results according to a preset filtering condition, and extract the filtering result as the tag identifier of the key field in a case that a filtering result is obtained.

Figure 9:
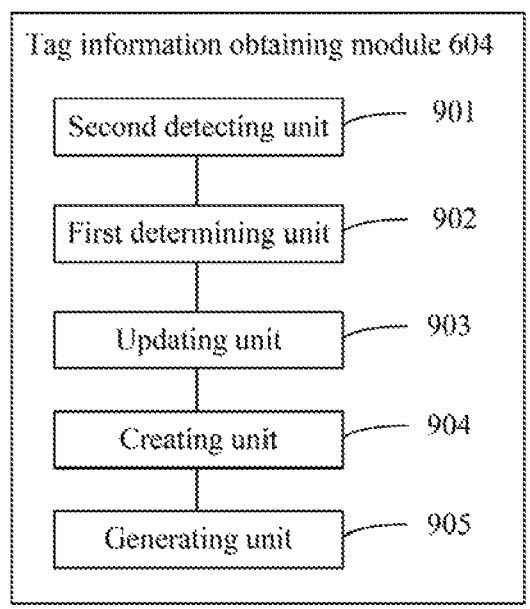
FIG. 9 is a structural diagram of a tag information obtaining module according to the third embodiment of the present disclosure.

In an embodiment, as shown in FIG. 9, the tag information obtaining module 604 may include:

a second detecting unit 901, configured to detect whether the tag information obtained matches at least one of multiple pieces of tag information pre-stored;

a first determining unit 902, configured to determine, in a case that the tag information obtained matches at least one of the multiple pieces of tag information pre-stored, the at least one of the multiple pieces of tag information to be matched tag information, and determine whether the generating time of the log information corresponding to the tag identifier extracted matches any of multiple predetermined time periods in the matched tag information;

an updating unit 903, configured to update, in a case that the generating time of the log information corresponding to the tag identifier extracted matches one of the multiple predetermined time periods, the number of times the tag identifier appears within the one of the multiple predetermined time periods; and a creating unit 904, configured to create a separate storage item based on the generating time of the log information corresponding to the tag identifier and count the number of times the tag identifier appears within the generating time of the log information corresponding to the tag identifier, in a case that the generating time of the log information corresponding to the tag identifier as extracted does not match any of the multiple predetermined time periods.

The tag information may include the tag identifier and an extraction type of the tag identifier.

In an embodiment, the detecting unit 901 is further configured to: detect whether the tag identifier of the tag information obtained and the extraction type of the tag identifier are identical with a tag identifier of the at least one of the multiple pieces of tag information pre-stored and an extraction type of the tag identifier.

In an embodiment, the tag information obtaining module 604 further includes:

a generating unit 905, configured to determine the user identifier and the data source identifier of the log information in the key field as a key, determine the tag identifier, the extraction type of the tag identifier and the number of times the tag identifier appears within the first predetermined time period as a value and store the key and the value correspondingly, to obtain the tag information, in a case the tag information obtained does not match any of the multiple pieces of tag information pre-stored.

Figure 10:
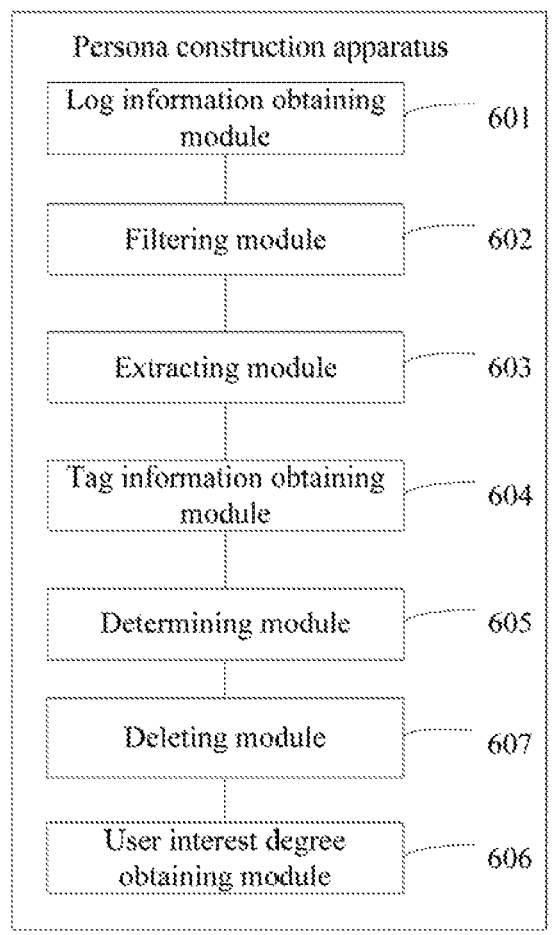
FIG. 10 is a structural diagram of another persona construction device according to the third embodiment of the present disclosure.

Further, as shown in FIG. 10, the apparatus further includes:

a deleting module 607, configured to delete a predetermined time period, which is stored longer than a second threshold, in the multiple predetermined time periods and delete the number of times the tag identifier appears within the deleted predetermined time period. The deleting module 607 is connected to the tag information obtaining module 604.

Figure 11:
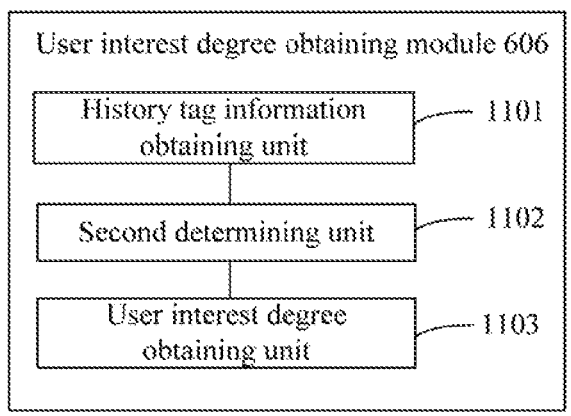
FIG. 11 is a structural diagram of a user interest degree obtaining module according to the third embodiment of the present disclosure.

In an embodiment, as shown in FIG. 11, the user interest degree obtaining module 606 may include:

a history tag information obtaining unit 1101, configured to obtain multiple pieces of history tag information corresponding to each of the categories of interest;

a second determining unit 1102, configured to determine weights of data sources, weights in each of the categories of interest, the numbers of times the tag identifier appears within the first predetermined time period and time attenuation factors corresponding to the tag information and the multiple pieces of history tag information, respectively; and a user interest degree obtaining unit 1103, configured to obtain the user interest degree corresponding to each of the categories of interest, based on the weights of data sources, the weights in each of the categories of interest, the numbers of times the tag identifier appears within the first predetermined time period and the time attenuation factors corresponding to the tag information and the multiple pieces of history tag information, respectively.

In summary, in the apparatus according to the embodiment of the disclosure, the key field is obtained by filtering the log information obtained, the tag identifier of the key field is extracted, the tag information is obtained based on the tag identifier and the key field, and thereby, the user interest degree corresponding to each of the categories of interest is obtained based on the current identifier information after determining all the categories of interest corresponding to the tag information, thus achieving rebuilding a real-time persona for the user after obtaining a piece of log information of the user, so that precise data information can be recommended for the user based on the real-time persona of the user, which has a good timeliness and improves the user experience.

Embodiment 4

A persona construction system is provided according to the embodiment, which is described in detail hereinafter in conjunction with FIG. 12 and the method according to the first and the second embodiments.

Figure 12:
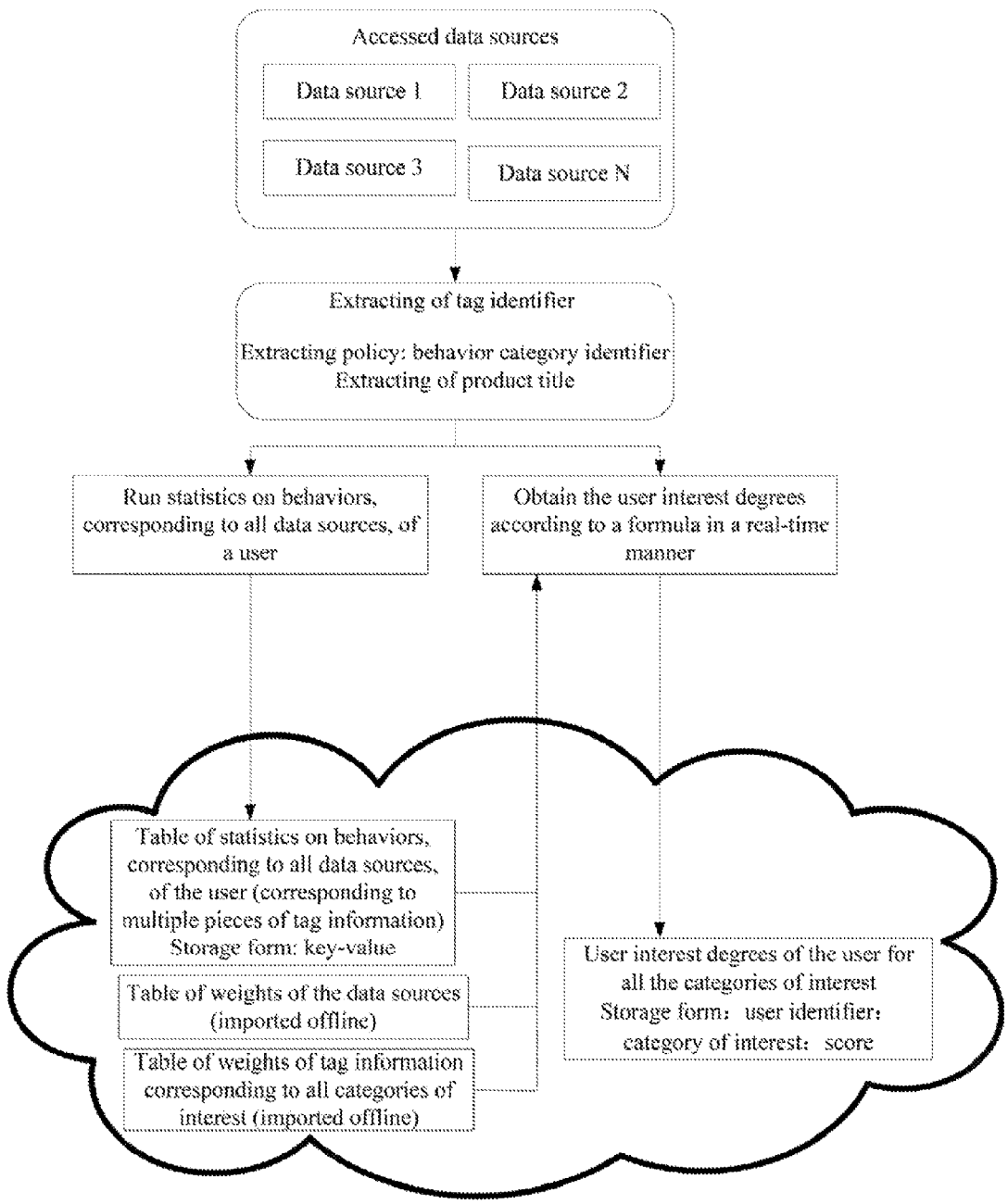

As shown in FIG. 12, the system includes three parts, a part for obtaining log information, a part for extracting tag identifiers and a part for calculating user interest degrees. The obtaining of log information can be performed by a spout (spout), the extracting of tag identifiers can be performed by a bolt (Bolt) and the obtaining of user interest degrees can be performed by a bolt (Bolt) as well.

Before obtaining log information, access connections are pre-established between a spout (spout) and multiple data sources, to obtain log information of the multiple data sources. The data sources accessed include but are not limited to six types of data sources. In a service system corresponding to each of the multiple data sources, there is a special log unit for recording behavior information of a user, where the behavior information of the user includes but is not limited to a behavior of browsing, purchasing, following or collecting a product. For example, a piece of new log information is generated once a user purchases a product at a time. The spout (spout) can initiatively obtain the piece of new log information.

Figure 13:
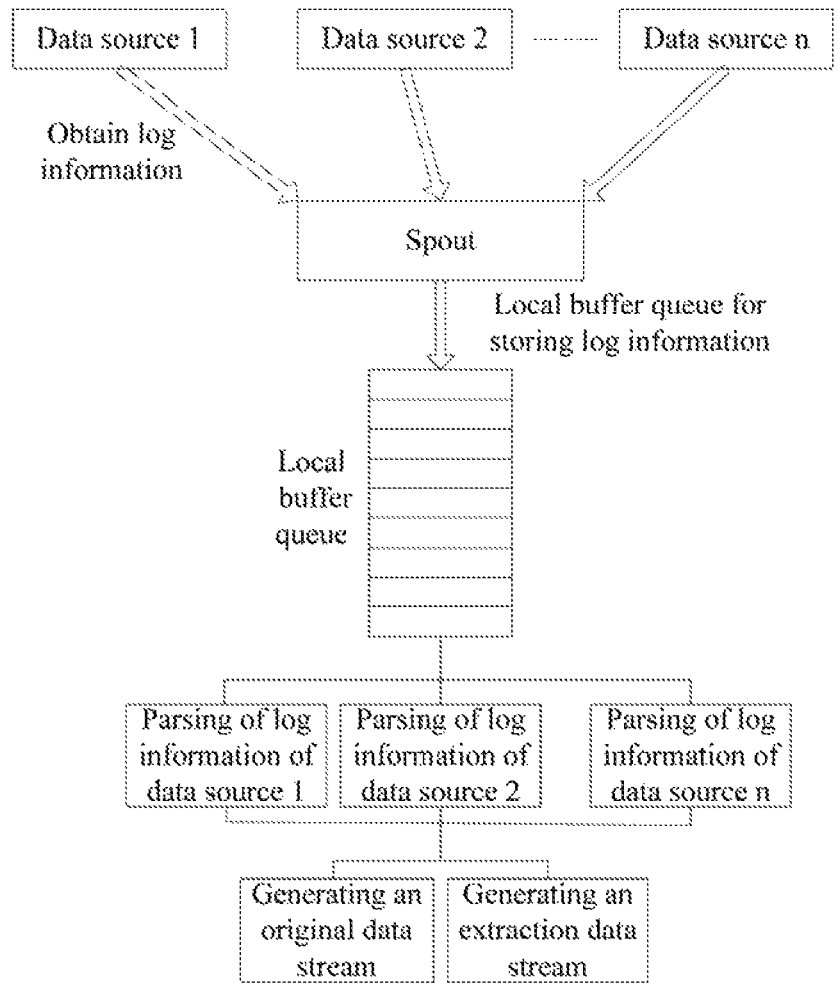
FIG. 13 is an operating flowchart of a spout according to the fourth embodiment of the present disclosure.
Figure 14:
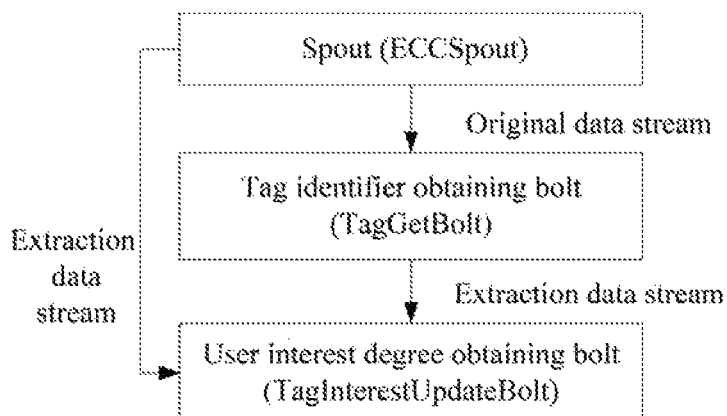
FIG. 14 is a schematic diagram of a flow direction of a data stream according to the fourth embodiment of the present disclosure.

As shown in FIG. 13, after obtaining the piece of new log information, the spout (spout) can store the piece of new log information in a local buffer queue and parse and filter log information in the local buffer queue in a first-in first-out order. After parsing and analyzing the log information, a key field of the log information is obtained. Depending on whether the key field includes a behavior category identifier, the spout (spout) can perform different sending processing on the key field. In a case the key field does not include any behavior category identifier, the key field is combined into an original data stream and the original data stream is sent to a tag identifier obtaining bolt (TagGetBolt) in FIG. 14, so that a tag identifier of the key field can be extracted from the original data stream and the tag identifier obtaining bolt (TagGetBolt) can send the tag identifier as extracted to a user interest degree bolt (TagInterestUpdateBolt). In a case the key field includes a behavior category identifier, the key field is combined into an extraction data stream (ECC_STREAM), and the extraction data stream is sent to the user interest degree obtaining bolt (TagInterestUpdateBolt) in FIG. 14, so that a user interest degree can be obtained in a following process based on the extraction data stream.

After the log information and the tag identifier are obtained above, calculations of user interest degrees corresponding to different categories of interest can be performed with the user interest degree obtaining bolt (TagInterestUpdateBolt). For a user, each behavior thereof of browsing, purchasing, following or collecting a product is stored in a local storage system in the form of tag information. Reference can be made to step 404 in the second embodiment above for a particular form and a step for storing the tag information, which is not described here redundantly. In addition, a table of weights of data sources and a table of weights of the tag information in corresponding categories of interest are stored in the local storage system as well. The table of the weights of the data sources and the table of the weights of the tag information in corresponding categories of interest can both be obtained by experience or model training, and can both be imported offline. Reference can be made to step 406 in the second embodiment above for the obtaining of user interest degrees of different categories of interest, which is not described here redundantly. After the user interest degrees of different categories of interest are obtained, the user interest degrees can be stored in the following table.

TABLE 1

| User identifier | Category of interest | Score (0-1) |
|---|---|---|
| User 1 | Category of interest 1 | Score 1 |
| User 1 | Category of interest 2 | Score 2 |
| ... | ... | ... |
| User 1 | Category of interest N | Score N |

Since the obtaining of a user interest degree of a category of interest is triggered each time the user performs a behavior, interest degrees of the user for different categories of interest can be obtained in a real-time manner, so that corresponding products can be recommended for the user based on latest interest degrees of the user for different categories of interest, which improves the user experience.

Embodiment 5

Figure 15:
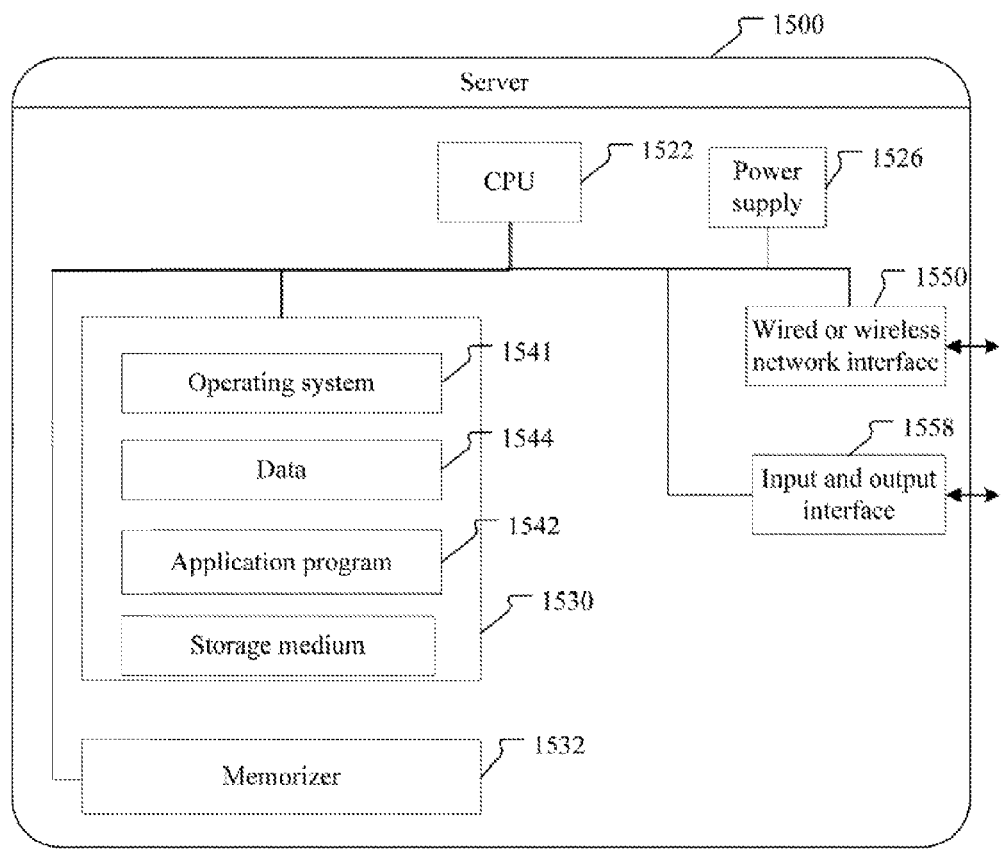
FIG. 15 is a structural diagram of a server according to a fifth embodiment of the present disclosure.

A server is provided according to the embodiment, which can be used to perform the persona construction method according to the embodiments above. As shown in FIG. 15, the server may be varied greatly due differences in configuration and performance, which may include one or more central processing units (central processing units, CPU) 1522, for example, one or more processors, a memorizer 1532 and one or more storage media 1530, for example, one or more massive storage devices, for storing an application program 1542 and data 1544. The memorizer 1532 and each of the one or more storage media 1530 each may be a temporary memory or a permanent memory. The application program stored in the one or more storage media 1530 may include one or more modules (not shown in FIG. 15), and each of the one or more modules may include a series of instruction operations in the server. Further, the one or more central processing units 1522 may be set to communicate with the one or more storage media 1530 and perform a series of instruction operations stored in the one or more storage media 1530 in the server 1500.

The server 1500 may further include one or more power supplies 1526, one or more wired or wireless network interfaces 1550, one or more input and output interfaces 1558 and/or one or more operating systems 1541, such as Windows Server™, Mac OS X™, Unix™, Linux™ and FreeBSD™.

In a specific embodiment, one or more processors are configured to execute the instructions, which are included in one or more programs, for performing the following operations:

obtaining log information of a user;

filtering the log information, to obtain a key field of the log information;

extracting a tag identifier of the key field;

obtaining tag information based on the tag identifier and the key field, where the tag information includes the number of times the tag identifier appears within a first predetermined time period;

determining categories of interest corresponding to the identifier information based on the tag identifier; and obtaining a user interest degree corresponding to each of the categories of interest based on the tag information.

Supposing the above is a first possible implementation, in a second possible implementation based on the first possible implementation, the key field at least includes a user identifier, a generating time of the log information, a data source identifier of the log information and a product identifier.

In a third possible implementation based on the second possible implementation, instructions for performing the following operations are further included in the memorizer of the server:

detecting whether the key field includes any behavior category identifier;

determining, in a case the key field includes a behavior category identifier, the behavior identifier as the tag identifier extracted; and obtaining a product title corresponding to the product identifier based on the product identifier in the key field and extracting the tag identifier based on the product title, in a case that the key field does not include any behavior category identifier.

In a fourth possible implementation based on the third possible implementation, instructions for performing the following operations are further included in the memorizer of the server:

performing word segmentation processing on the product title according to a preset grammar rule, to obtain multiple word segmentation results of the product title; and filtering and analyzing the multiple word segmentation results according to a preset filtering condition, to obtain a filtering result, and extracting the filtering result as the tag identifier.

In a fifth possible implementation based on the second possible implementation, instructions for performing the following operations are further included in the memorizer of the server:

detecting whether the tag information as obtained matches at least one of multiple pieces of tag information pre-stored;

determining, in a case the tag information as obtained matches at least one of the multiple pieces of tag information pre-stored, the at least one of the multiple pieces of tag information to be matched tag information, and determining whether the generating time of the log information corresponding to the tag identifier as extracted matches any of multiple predetermined time periods in the matched tag information;

updating, in a case the generating time of the log information corresponding to the tag identifier as extracted matches one of the multiple predetermined time periods, the number of times the tag identifier appears within the one of the multiple predetermined time periods; and creating a separate storage item based on the generating time of the log information corresponding to the tag identifier as extracted and counting the number of times the tag identifier as extracted appears within the generating time of the log information corresponding to the tag identifier, in a case the generating time of the log information corresponding to the tag identifier as extracted does not match any of the multiple predetermined time periods.

In a sixth possible implementation based on the fifth possible implementation, the tag information further includes the tag identifier and an extraction type of the tag identifier.

In a seventh possible implementation based on the fifth possible implementation, the detecting whether the tag information as obtained matches at least one of multiple pieces of tag information pre-stored includes:

detecting whether the tag identifier of the tag information as obtained and the extraction type of the tag identifier are identical with a tag identifier of the at least one of the multiple pieces of tag information pre-stored and an extraction type of the tag identifier.

In an eighth possible implementation based on the sixth possible implementation, instructions for performing the following operations are further included in the memorizer of the server:

determining the user identifier and the data source identifier of the log information in the key field to be a key, determining the tag identifier, the extraction type of the tag identifier and the number of times the tag identifier appears within the first predetermined time period to be a value and storing the key and the value correspondingly, to obtain tag information, in a case the tag information as obtained does not match any of the multiple pieces of tag information pre-stored.

In a ninth possible implementation based on any of the fifth to the eighth possible implementations, instructions for performing the following operations are further included in the memorizer of the server:

deleting a predetermined time period, which has been stored longer than a second threshold, in the multiple predetermined time periods; and deleting the number of times a tag identifier corresponding to the predetermined time period as deleted appears.

In a tenth possible implementation based on the first possible implementation, instructions for performing the following operations are further included in the memorizer of the server:

obtaining history tag information corresponding to each of the categories of interest;

determining weights of data sources, weights in each of the categories of interest, the numbers of times the tag identifier appears within the first predetermined time period and time attenuation factors corresponding to the tag information and the history tag information, respectively; and obtaining the user interest degree corresponding to each of the categories of interest, based on the weights of data sources, the weights in each of the categories of interest, the numbers of times the tag identifier appears within the first predetermined time period and the time attenuation factors corresponding to the tag information and the history tag information, respectively.

In an eleventh possible implementation based on the tenth possible implementation, instructions for performing the following operations are included in the memorizer of the server:

obtaining the user interest degree corresponding to each of the categories of interest, based on the weights of data sources, the weights in each of the categories of interest, the numbers of times the tag identifier appears within the first predetermined time period and the time attenuation factors corresponding to the tag information and the history tag information, respectively, which includes calculating the user interest degree corresponding to each of the categories of interest according to the following formula:

$$\text{Score} = \cfrac{1}{1 + \gamma * \exp\left[\cfrac{-\sum_{i=0}^{i=m}\left(\lambda(i) * \sum_{j=0}^{j=n}\left(w(j) * \sum_{t=0}^{t=k}\left(\begin{array}{c}\text{weakenFactor}(t) * \\ \text{count}(t)\end{array}\right)\right)\right)}{b}\right]},$$

where Score represents the user interest degree, $\lambda(i)$ represents a weight of a data source corresponding to each piece of tag information, $w(j)$ represents a corresponding weight of a piece of tag information in each of the categories of interest, weakenFactor(t) represents a time attenuation factor, count(t) represents the number of times the tag identifier appears within the first predetermined time period, m represents the number of the data sources, n represents the number of pieces of tag information corresponding to each of the data sources, and $\gamma$ and b are both constants.

In the server according to the embodiment, the key field is obtained by filtering the log information obtained, the tag identifier of the key field is extracted, the tag information is obtained based on the tag identifier and the key field, and thereby, the user interest degree corresponding to each of the categories of interest is obtained based on the current identifier information after determining all the categories of interest corresponding to the tag information, thus achieving rebuilding a real-time persona for the user after obtaining a piece of log information of the user, so that precise data information can be recommended for the user based on the real-time persona of the user, which has a good timeliness and improves the user experience.

Embodiment 5

A computer readable storage medium is provided according to the present disclosure, and the computer readable storage medium may be a computer readable storage medium included in the server according to the embodiment above, or an independent computer readable storage medium which is not installed to a server. One or more programs are stored in the computer readable storage medium, and the one or more programs are executed by one or more processors to perform a persona construction method, where the method includes:

obtaining log information of a user;

filtering the log information, to obtain a key field of the log information;

extracting a tag identifier of the key field;

obtaining tag information based on the tag identifier and the key field, where the tag information includes the number of times the tag identifier appears within a first predetermined time period;

determining categories of interest corresponding to the identifier information based on the tag identifier; and obtaining a user interest degree corresponding to each of the categories of interest based on current tag information.

Supposing the above is a first possible implementation, in a second possible implementation based on the first possible implementation, the key field at least includes a user identifier, a generating time of the log information, a data source identifier of the log information and a product identifier.

In a third possible implementation based on the second possible implementation, the extracting a tag identifier of the key field includes:

detecting whether the key field includes a behavior category identifier;

determining, in a case that the key field includes a behavior category identifier, the behavior identifier as the tag identifier as extracted; and obtaining a product title corresponding to the product identifier based on the product identifier in the key field and extracting the tag identifier based on the product title, in a case that the key field does not include a behavior category identifier.

In a fourth possible implementation based on the third possible implementation, extracting the tag identifier based on the product title includes:

performing segmentation on the product title according to a preset grammar rule, to obtain multiple segmentation results of the product title; and filtering and analyzing the multiple segmentation results according to a preset filtering condition, to obtain a filtering result, and extracting the filtering result as the tag identifier.

In a fifth possible implementation based on the second possible implementation, obtaining current tag information based on the tag identifier and the key field includes:

detecting whether the tag information as obtained matches at least one of multiple pieces of tag information pre-stored;

determining, in a case that the tag information obtained matches at least one of the multiple pieces of tag information pre-stored, the at least one of the multiple pieces of tag information as matched tag information, and determining whether the generating time of the log information corresponding to the tag identifier extracted matches any of multiple predetermined time periods in the matched tag information;

updating, in a case the generating time of the log information corresponding to the tag identifier as extracted matches one of the multiple predetermined time periods, the number of times the tag identifier appears within the one of the multiple predetermined time periods; and creating a separate storage item based on the generating time of the log information corresponding to the tag identifier as extracted and counting the number of times the tag identifier extracted appears within the generating time of the log information corresponding to the tag identifier, in a case that the generating time of the log information corresponding to the tag identifier extracted does not match any of the multiple predetermined time periods.

In a sixth possible implementation based on the fifth possible implementation, the tag information further includes the tag identifier and an extraction type of the tag identifier.

In a seventh possible implementation based on the fifth possible implementation, the detecting whether the tag information as obtained matches at least one of multiple pieces of tag information pre-stored includes:

detecting whether the tag identifier of the tag information obtained and the extraction type of the tag identifier are identical with a tag identifier of the at least one of the multiple pieces of tag information pre-stored and an extraction type of the tag identifier respectively.

In an eighth possible implementation based on the sixth possible implementation, after the detecting whether the tag information as obtained matches at least one of multiple pieces of tag information pre-stored, the method further includes:

determining the user identifier and the data source identifier of the log information in the key field as a key, determining the tag identifier, the extraction type of the tag identifier and the number of times the tag identifier appears within the first predetermined time period as a value and storing the key and the value correspondingly, to obtain the tag information, in a case that the tag information as obtained does not match any of the multiple pieces of tag information pre-stored.

In a ninth possible implementation based on any of the fifth to the eighth possible implementations, the method further includes:

deleting a predetermined time period, which is stored longer than a second threshold, in the multiple predetermined time periods; and deleting the number of times the tag identifier appears within the deleted predetermined time period.

In a tenth possible implementation based on the first possible implementation, the obtaining a user interest degree corresponding to each of the categories of interest includes:

obtaining history tag information corresponding to each of the categories of interest;

determining weights of data sources, weights in each of the categories of interest, the numbers of times the tag identifier appears within the first predetermined time period and time attenuation factors corresponding to the tag information and the history tag information, respectively; and obtaining the user interest degree corresponding to each of the categories of interest, based on the weights of data sources, the weights in each of the categories of interest, the numbers of times the tag identifier appears within the first predetermined time period and the time attenuation factors corresponding to the current tag information and the history tag information, respectively.

In an eleventh possible implementation based on the tenth possible implementation, the obtaining the user interest degree corresponding to each of the categories of interest, based on the weights of data sources, the weights in each of the categories of interest, the numbers of times the tag identifier appears within the first predetermined time period and the time attenuation factors corresponding to the tag information and the history tag information, respectively, includes $$Score = \frac{1}{1+\gamma*\exp\left[-\sum_{i=0}^{i=m}\left(\frac{\lambda(i)*\left(\sum_{j=0}^{j=n}\left(w(j)*\sum_{t=0}^{t=k}\left(\frac{weakenFactor(t)*}{count(t)}\right)\right)\right)}{b}\right)\right]},$$

where Score represents the user interest degree, $\lambda(i)$ represents a weight of a data source corresponding to each piece of tag information, $w(j)$ represents a corresponding weight of a piece of tag information in each of the categories of interest, weakenFactor(t) represents a time attenuation factor, count(t) represents the number of times the tag identifier appears within the first predetermined time period, m represents the number of the data sources, n represents the number of pieces of tag information corresponding to each of the data sources, and $\gamma$ and b are both constants.

In the computer readable storage medium according to the embodiment, the key field is obtained by filtering the log information obtained, the tag identifier of the key field is extracted, the tag information is obtained based on the tag identifier and the key field, and thereby, the user interest degree corresponding to each of the categories of interest is obtained based on the current identifier information after determining all the categories of interest corresponding to the tag information, thus achieving rebuilding a real-time persona for the user after obtaining a piece of log information of the user, so that precise data information can be recommended for the user based on the real-time persona of the user, which has a good timeliness and improves the user experience.

It should be noted that the division of the functional modules above in the persona construction apparatus according to the embodiment above is only illustrated for example. In practical applications, the functions above may be assigned to different functional modules to realize as needed, i.e., the inner structure of the apparatus is divided into different functional modules, to realize all or a part of the functions described above. Besides, the persona construction apparatus and the persona construction method according to the embodiments above fall within one idea, and reference can be made to the method embodiments for a specific implementation process of the apparatus, which is not described here redundantly.

Serial numbers of the embodiments above according the present disclosure are only used for description, rather than representing merits of the embodiments.

Those in the art shall understand that all or a part of the steps according to the embodiments above may be performed through hardware, or performed through related hardware under instructions of a program. The program may be stored in a computer readable storage medium, which may be a read-only memory, a magnetic disk or an optical disc.

The embodiments above are only some preferred embodiments of the disclosure and are not intended to limit the disclosure. Any modifications, equivalent substitutions or improvements made within the spirit and principle of the disclosure shall fall within the scope of the disclosure.

The invention claimed is:

1. A persona construction method performed on a server including a memory having codes stored therein and a hardware processor, wherein, the processor executing the stored codes to configure the server to perform the following operations:
   Obtaining, by the hardware processor, log information of a user;
   filtering, by the hardware processor, the log information, to obtain a key field of the log information;
   extracting, by the hardware processor, a tag identifier of the key field, wherein the key field comprises a user identifier, a generating time of the log information, a data source identifier of the log information and a product identifier;
   obtaining, by the hardware processor, tag information based on the tag identifier and the key field, wherein the tag information comprises the number of times the tag identifier appears within a first predetermined time period;
   determining, by the hardware processor, a category of interest corresponding to the identifier information based on the tag identifier;
   obtaining, by the hardware processor, a user interest degree corresponding to the category of interest based on the tag information to construct a real-time persona of the user; and
   providing, by the hardware processor, data information for the user based on the real-time persona of the user;
   wherein extracting, by the hardware processor, the tag identifier of the key field comprises:
   detecting, by the hardware processor, whether the key field comprises a behavior category identifier;
   in case that the key filed comprises a behavior category identifier, determining, by the processor, the behavior identifier as the tag identifier; and
   in case that the key field does not comprise a behavior category identifier, obtaining, by the hardware processor, a product title corresponding to the product identifier based on the product identifier in the key field and extracting the tag identifier based on the product title.

2. The method according to claim 1, wherein extracting, by the hardware processor, the tag identifier based on the product title comprises:
   performing, by the hardware processor, segmentation on the product title according to a preset grammar rule, to obtain a plurality of segmentation results of the product title; and
   filtering and analyzing, by the hardware processor, the plurality of segmentation results according to a preset filtering condition, to obtain a filtering result, and extracting the filtering result as the tag identifier.

3. The method according to claim 1, wherein obtaining, by the hardware processor, tag information based on the tag identifier and the key field comprises:
   detecting, by the hardware processor, whether the tag information matches at least one of a plurality of pieces of tag information pre-stored;
   in a case that the tag information matches at least one of the plurality of pieces information pre-stored, determining, by the hardware processor, the at least one piece of tag information as matched tag information;
   determining, by the hardware processor, whether the generating time of the log information corresponding to the tag identifier matches one of a plurality of predetermined time periods in the matched tag information;
   in a case that the generating time of the log information corresponding to the tag identifier matches one of the plurality of predetermined time periods, updating, by the hardware processor, the number of times the tag identifier appears within the one of predetermined time periods; and
   in a case that the generating time of the log information corresponding to the tag identifier does not match any of the plurality of predetermined time periods, creating, by the hardware processor, a separate storage item based on the generating time of the log information corresponding to the tag identifier and counting, by the hardware processor, the number of times the tag identifier appears within the generating time of the log information corresponding to the tag identifier.

4. The method according to claim 3, wherein the tag information further comprises the tag identifier and an extraction type of the tag identifier.

5. The method according to claim 4, wherein detecting, by the hardware processor, whether the tag information matches at least one of a plurality of pieces of tag information pre-stored comprises:
   detecting, by the hardware processor, whether the tag identifier of the tag information and the extraction type of the tag identifier are identical with a tag identifier and an extraction type of at least one of the plurality of pieces of tag information pre-stored, respectively.

6. The method according to claim 4, wherein after detecting, by the hardware processor, whether the tag information matches at least one of a plurality of pieces of tag information pre-stored, the method further comprises:
   in a case that the tag information does not match any of the plurality of pieces of tag information pre-stored, determining, by the hardware processor, the user identifier and the data source identifier of the log information in the key field as a key, determining, by the hardware processor, the tag identifier, the extraction type of the tag identifier and the number of times the tag identifier appears within the first predetermined time period as a value and storing, by the hardware processor, the key and the value, to obtain the tag information.

7. The method according to claim 3, further comprising:
   deleting, by the hardware processor, a predetermined time period, which is stored longer than a second threshold, in the plurality of predetermined time periods; and deleting, by the hardware processor, the number of times the tag identifier appears within the deleted predetermined time period.

8. The method according to claim 1, wherein obtaining, by the processor, a user interest degree corresponding to each of the categories of interest comprises:
obtaining, by the hardware processor, history tag information corresponding to the category of interest;
determining, by the hardware processor, weights of data sources, weights of the category of interest, the numbers of times the tag identifier appears within the first predetermined time period and time attenuation factors corresponding to the tag information and the history tag information; and
obtaining, by the hardware processor, the user interest degree corresponding to the category of interest, based on the weights of data sources, the weights of the category of interest, the numbers of times the tag identifier appears within the first predetermined time period and the time attenuation factors corresponding to the tag information and the history tag information.

9. The method according to claim 8, wherein obtaining, by the hardware processor, the user interest degree corresponding to the category of interest, based on the weights of data sources, the weights of the category of interest, the numbers of times the tag identifier appears within the first predetermined time period and the time attenuation factors corresponding to the tag information and the history tag information, comprises calculating, by the hardware processor, the user interest degree corresponding to the category of interest according to the following formula:

$$Score = \frac{1}{1+\gamma * \exp\left[-\sum_{i=0}^{i=m}\left(\frac{\lambda(i)*}{\sum_{j=0}^{j=n}\left(w(j)*\sum_{t=0}^{t=k}\left(\frac{weakenFactor(t)*}{count(t)}\right)\right)}\right)\right]}$$

wherein Score represents the user interest degree, $\lambda(i)$ represents a weight of a data source corresponding to each piece of tag information, $w(j)$ represents a corresponding weight of a piece of tag information in each of the categories of interest, weakenFactor(t) represents a time attenuation factor, count(t) represents the number of times the tag identifier appears within the first predetermined time period, m represents the number of the data sources, n represents the number of pieces of tag information corresponding to each of the data sources, and $\gamma$ and b are constants.

10. A server including a memory having codes stored therein and a hardware processor for executing the codes stored in the memory, wherein the hardware processor configures the server to:
obtain log information of a user;
filter the log information to obtain a key field of the log information;
extract a tag identifier of the key field, wherein the key field comprises a user identifier, a generating time of the log information, a data source identifier of the log information and a product identifier;
obtain tag information based on the tag identifier and the key field, wherein the tag information comprises the number of times the tag identifier appears within a first predetermined time period;
determine a category of interest corresponding to the tag information based on the tag identifier;
obtain a user interest degree corresponding to the category of interest based on the tag information to construct a real-time persona of the user; and
provide data information for the user based on the real-time persona of the user;
wherein the processor is further configured to:
detect whether the key field comprises a behavior category identifier;
determine, in a case that the key field comprises a behavior category identifier, the behavior identifier as the tag identifier; and
obtain a product title corresponding to the product identifier based on the product identifier in the key field and extract the tag identifier based on the product title, in a case that the key field does not comprise a behavior category identifier.

11. The apparatus according to claim 10, wherein the hardware processor is further configured to:
perform segmentation on the product title according to a preset grammar rule, to obtain a plurality of segmentation results of the product title; and
filter and analyze the plurality of segmentation results according to a preset filtering condition, and extract the filtering result as the tag identifier of the key field in a case that a filtering result is obtained.

12. The apparatus according to claim 10, wherein the hardware processor is further configured to:
detect whether the tag information matches at least one of a plurality of pieces of tag information pre-stored;
determine, in a case that the tag information matches at least one of the plurality of pieces of tag information pre-stored, the at least one pieces of tag information as matched tag information, and determine whether the generating time of the log information corresponding to the tag identifier matches one of a plurality of predetermined time periods in the matched tag information;
update, in a case the generating time of the log information corresponding to the tag identifier matches one of the plurality of predetermined time periods, the number of times the tag identifier appears within the one of predetermined time periods; and
create a separate storage item based on the generating time of the log information corresponding to the tag identifier and count the number of times the tag identifier appears within the generating time of the log information corresponding to the tag identifier, in a case that the generating time of the log information corresponding to the tag identifier does not match any of the plurality of predetermined time periods.

13. The apparatus according to claim 12, wherein the tag information further comprises the tag identifier and an extraction type of the tag identifier.

14. The apparatus according to claim 13, wherein the hardware processor is further configured to: detect whether the tag identifier of the tag information and the extraction type of the tag identifier are identical with a tag identifier and an extraction type of at least one of the plurality of pieces of tag information pre-stored, respectively.

15. The apparatus according to claim 13, wherein the hardware processor is further configured to:
determine the user identifier and the data source identifier of the log information in the key field as a key, determine the tag identifier, the extraction type of the tag identifier and the number of times the tag identifier appears within the first predetermined time period as a value and store the key and the value, to obtain the tag information, in a case that the tag information does not match any of the plurality of pieces of tag information pre-stored.

16. The apparatus according to claim 12, wherein the hardware processor is further configured to:
delete a predetermined time period, which is stored longer than a second threshold, in the plurality of predetermined time periods and delete the number of times the tag identifier appears within the deleted predetermined time period.

17. The apparatus according to claim 10, wherein the hardware processor is further configured to:
obtain history tag information corresponding to the category of interest;
determine weights of data sources, weights of the category of interest, the numbers of times the tag identifier appears within the first predetermined time period and time attenuation factors corresponding to the tag information and the plurality of pieces of history tag information; and
obtain the user interest degree corresponding to the category of interest, based on the weights of data sources, the weights of the category of interest, the numbers of times the tag identifier appears within the first predetermined time period and the time attenuation factors corresponding to the tag information and the plurality of pieces of history tag information.

18. The apparatus according to claim 17, wherein the hardware processor is further configured to calculate the user interest degree corresponding to the category according to the following formula:

$$Score = \frac{1}{1 + \gamma * \exp\left[-\sum_{i=0}^{i=m}\left(\frac{\lambda(i) * \sum_{j=0}^{j=n}\left(w(j) * \sum_{t=0}^{t=k}\left(weakenFactor(t) * count(t)\right)\right)}{b}\right)\right]},$$

wherein Score represents the user interest degree, $\lambda(i)$ represents a weight of a data source corresponding to each piece of tag information, $w(j)$ represents a corresponding weight in each of the categories of interest, $weakenFactor(t)$ represents a time attenuation factor, $count(t)$ represents the number of times the tag identifier appears within the first predetermined time period, m represents the number of the data sources, n represents the number of pieces of tag information corresponding to each of the data sources, and $\gamma$ and b are constants.

* * * * *